(12) United States Patent
Krusell

(10) Patent No.: US 6,626,336 B1
(45) Date of Patent: Sep. 30, 2003

(54) ADAPTER SYSTEM

(76) Inventor: Marcus Krusell, Petsmansvagen BD, Molnlycke S-43542 (SE)

( * ) Notice: Subject to any disclaimer, the term of this patent is extended or adjusted under 35 U.S.C. 154(b) by 0 days.

(21) Appl. No.: 09/763,389

(22) PCT Filed: Jun. 11, 1999

(86) PCT No.: PCT/SE99/01037
§ 371 (c)(1),
(2), (4) Date: Feb. 21, 2001

(87) PCT Pub. No.: WO99/65357
PCT Pub. Date: Dec. 23, 1999

(30) Foreign Application Priority Data

Jun. 15, 1998 (SE) .................................. 9802158

(51) Int. Cl.⁷ .................................................. A45F 5/00
(52) U.S. Cl. ...................... 224/271; 24/3.11; 224/666; 224/669; 224/269
(58) Field of Search ................... 224/271, 666, 224/669, 269; 24/3.11, 3.12

(56) References Cited

U.S. PATENT DOCUMENTS

| | | | | |
|---|---|---|---|---|
| 5,014,892 A | * | 5/1991 | Copeland | ................... 224/242 |
| 5,375,749 A | | 12/1994 | Oliva | |
| 5,540,368 A | * | 7/1996 | Oliva | ........................ 224/242 |
| 5,730,342 A | | 3/1998 | Tien | |
| 5,730,348 A | * | 3/1998 | Tien | ............................ 224/271 |
| 5,850,954 A | * | 12/1998 | Dong-Joo | ................... 224/197 |
| 6,059,156 A | * | 5/2000 | Lehtinen | ..................... 224/197 |
| 6,098,858 A | * | 8/2000 | Laugesen | ..................... 224/197 |
| 6,233,788 B1 | * | 5/2001 | Choy et al. | ................. 224/197 |
| 6,283,348 B1 | * | 9/2001 | Wang | ......................... 224/197 |
| 6,286,737 B1 | * | 9/2001 | Whitley | ..................... 224/196 |
| 6,315,182 B1 | * | 11/2001 | Chen | .......................... 224/271 |
| 6,364,184 B1 | * | 4/2002 | Hauck et al. | ............... 224/197 |

FOREIGN PATENT DOCUMENTS

| | | |
|---|---|---|
| DE | 196 45 578 | 5/1998 |
| GB | 2 301 858 | 6/1995 |
| GB | 2 310 883 | 9/1997 |
| SE | 9701336-1 | 9/1998 |

* cited by examiner

Primary Examiner—Robin A. Hylton
(74) Attorney, Agent, or Firm—Oppedahl & Larson LLP

(57) ABSTRACT

An adapter system for tools, phones and cases and bags, in particular for mobile phone cases, whereby the adapter system comprises a connector for a multi purpose use, whereby the adapter system comprises 1) an adapter (4) comprising a first washer (4*a*) having a substantially U-shaped space (11) provided with a flange, and a locking snapping tongue (6, 7), which adapter (4) is arranged to be brought into operation with 2) a holder (9, 22) provided with a second washer (10, 23) arranged to be brought into operation with said flange provided space (11) in said first washer (4*a*).

17 Claims, 9 Drawing Sheets

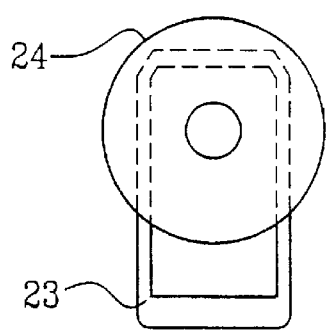
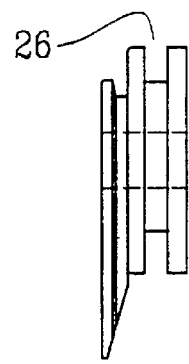
FIG.15  FIG.16
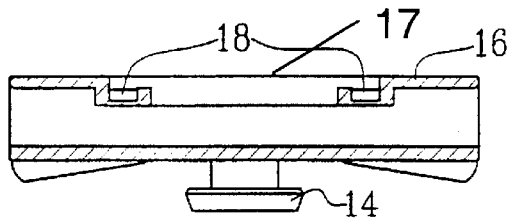
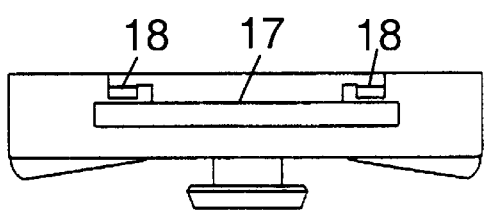
FIG.18  FIG.19
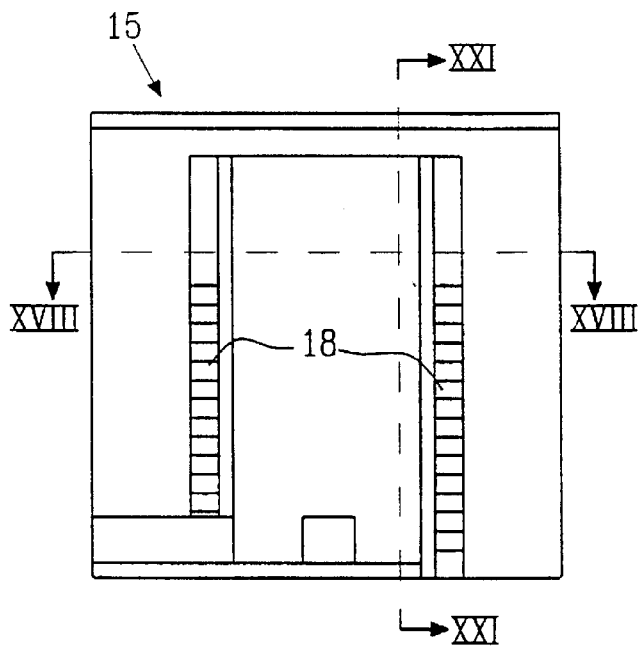
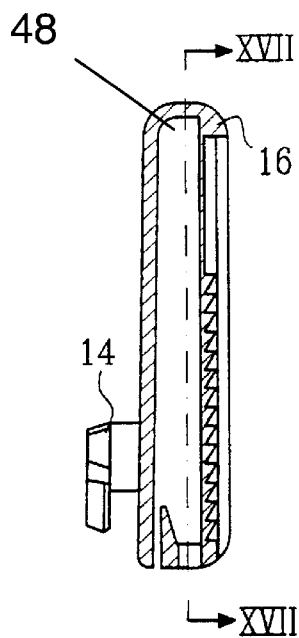
FIG.17  FIG.20

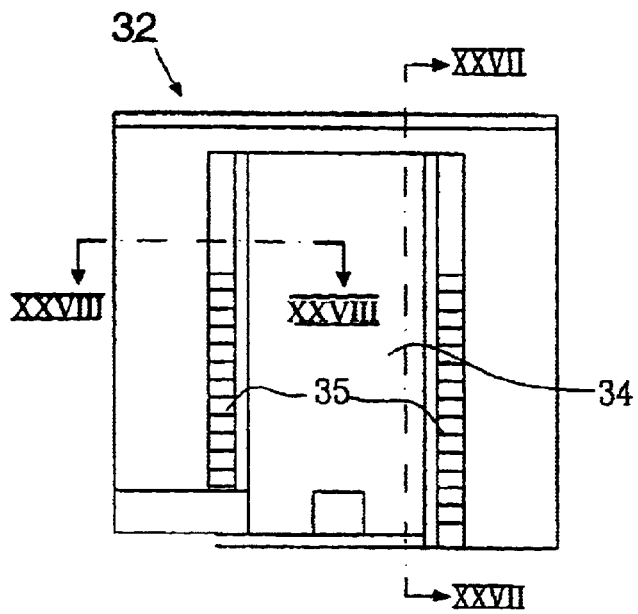
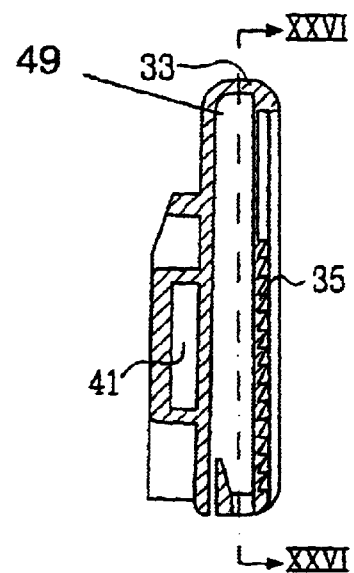
FIG. 26    FIG. 27
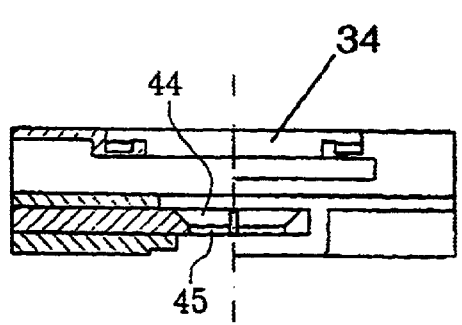
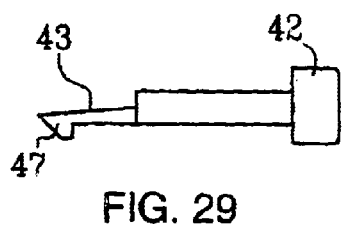
FIG. 29
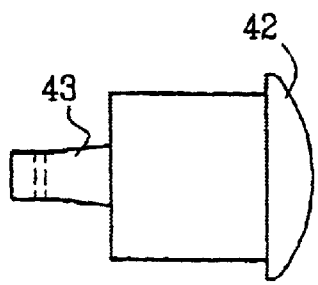
FIG. 28    FIG. 30

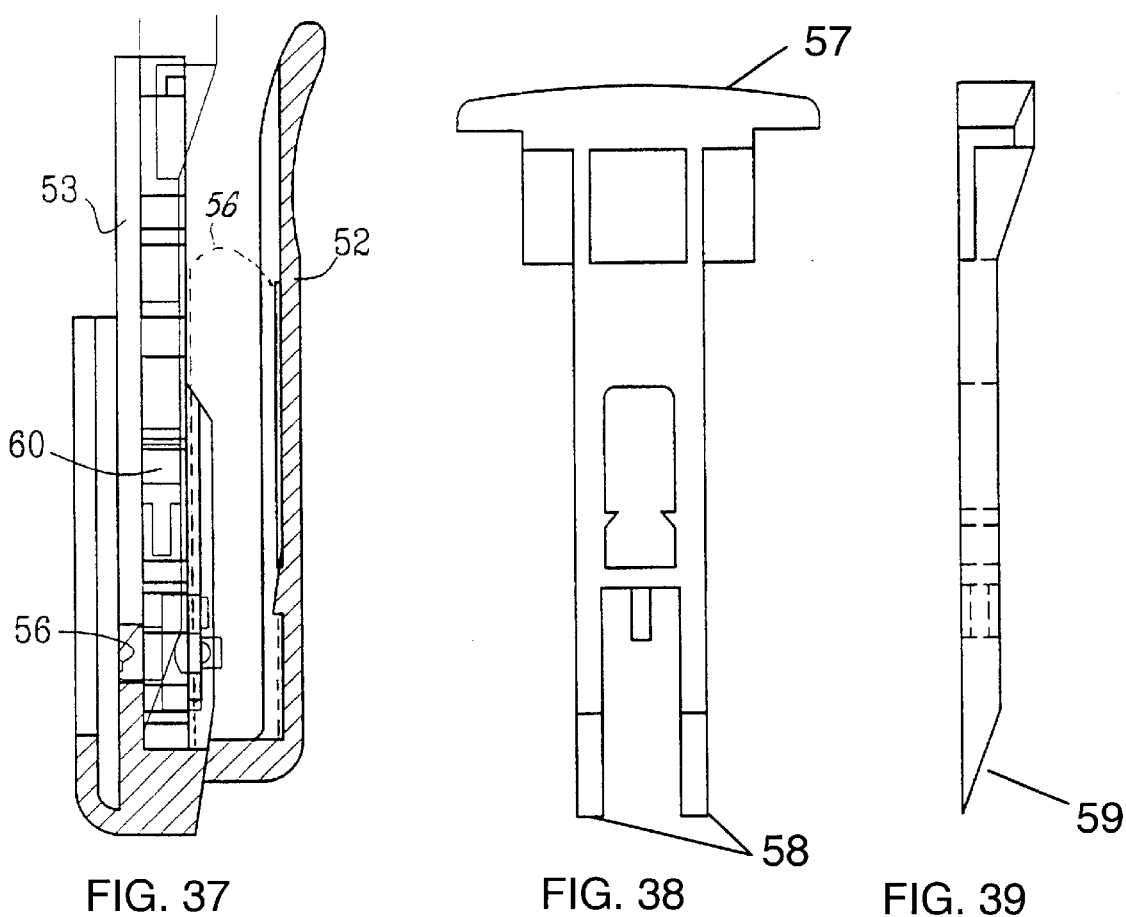
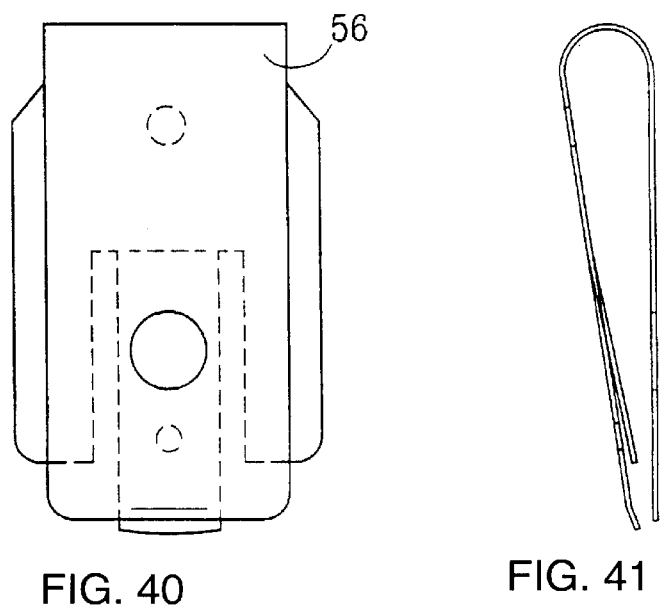

ADAPTER SYSTEM

TECHNICAL FIELD

The present invention relates to an adapter system for tools, phones and cases and bags, in particular for mobile phone cases, whereby the object is provided with a joint related to a connector.

The object of the present invention is to obtain a rational and flexible adapter system for tools, phones and cases and bags, in particular for mobile phone, where a locking of the object, such as a case with its mobile phone to a belt, a pocket opening, a trousers band, a car holder, and the similar is possible in a simple and variable way.

BACKGROUND OF THE INVENTION

It is previously known different clips or holders for mobile phones intended to be attached the mobile phone to a belt or trousers band in order to have it readily available. Normally, the clips is thereby attached directly to the phone apparatus and is threaded over the belt edge or a trousers band. Any particular locking means are thereby not present but the phone can slip out of its grip with the belt or trousers or a pocket.

Further, it is known mobile phone bags or cases of leather to hang onto a belt or sash, whereby a loop is an integrated part of the case, in which loop the belt is slipped through. Normally, the loop is rivetted to the case in one or both ends. The phone can be reached by opening a lid and removing the phone.

Mobile phones of today are a multi purpose tool and should be at hands and be readily available in all situations. Thus, it shall, at one time point, be placed in a car, and at the next time point be readily removable from the car to follow the user to a working place, whereby the demand for availability shall be great, as well as the security that the mobile phone is not dropped or lost. That is to say that the demands for a variation of use, ready availability, and security are great.

DESCRIPTION OF THE PRESENT INVENTION

It has now surprisingly turned out possible to meet these demands by means of the present invention which is characterized in that the adapter system comprises 1) an adapter comprising a first washer having a substantially U-shaped space provided with a flange, and a locking snapping tongue, which adapter is arranged to be brought into operation with
2) a holder provided with a second washer arranged to be brought into operation with said flange provided space in said first washer.

By means of the present invention a very flexible and security adapted solution is obtained of the above mentioned problem.

The invention will be described more in detail in the following with reference to the attached drawing, wherein FIG. 1 shows a stiffening plate according to the present invention in a frontal view;

FIG. 15 shows a holder according to the invention in the form of an alternative button in a frontal view;

FIG. 16 shows the button according to FIG. 15 seen from the side;

FIG. 17 shows a belt holder according to the invention to which the clip of FIG. 6 can attached;

FIG. 18 shows the belt holder in a cross-section along the line XVIII—XVIII of FIG. 17

FIG. 19 shows the belt holder according to FIG. 17 seen from above;

FIG. 20 shows the belt holder according to FIG. 17 seen from the side;

FIG. 26 shows another embodiment of the belt holder, than the one showed in FIG. 17;

FIG. 27 shows the belt holder in a cross-section along the line XXVII—XXVII of FIG. 26;

FIG. 28 shows the belt holder according to FIG. 26 seen from above;

FIG. 29 shows a release mechanism of the belt holder according to FIG. 26 seen from the side;

FIG. 30 shows the release mechanism according to FIG. 29 seen from above;

FIG. 37 shows the clip in a cross-section along the line XXXVIII—XXXVIII of FIG. 35;

FIG. 38 shows the release mechanism of the clip of FIG. 35 in a frontal view;

FIG. 39 shows the release mechanism of FIG. 38 seen from the side;

FIG. 40 shows a spring for forced attachment of the clip to a trousers band or the similar in a frontal view; and FIG. 41 shows the spring according to FIG. 40 seen from the side;

Figure 3:
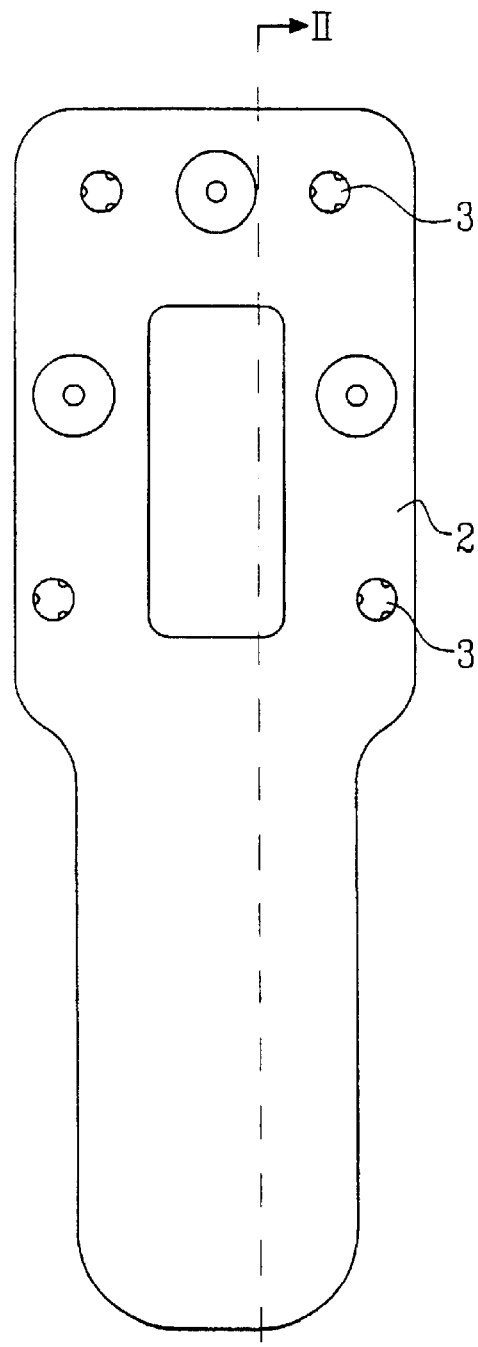
FIG. 3 shows the stiffening plate according to FIG. 1 seen from above.
Figures 1, 2:
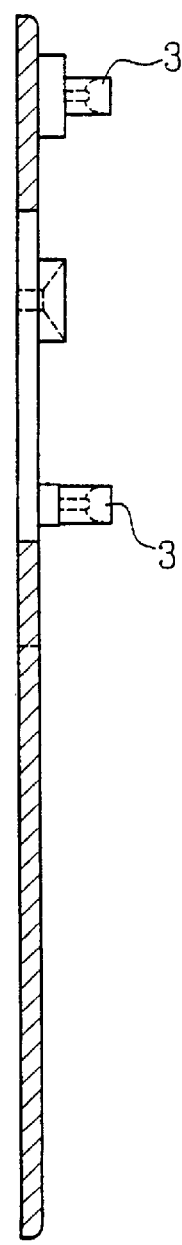
FIG. 2 shows the stiffening plate in a cross-section along the line II—II of FIG. 1.
Figure 4:
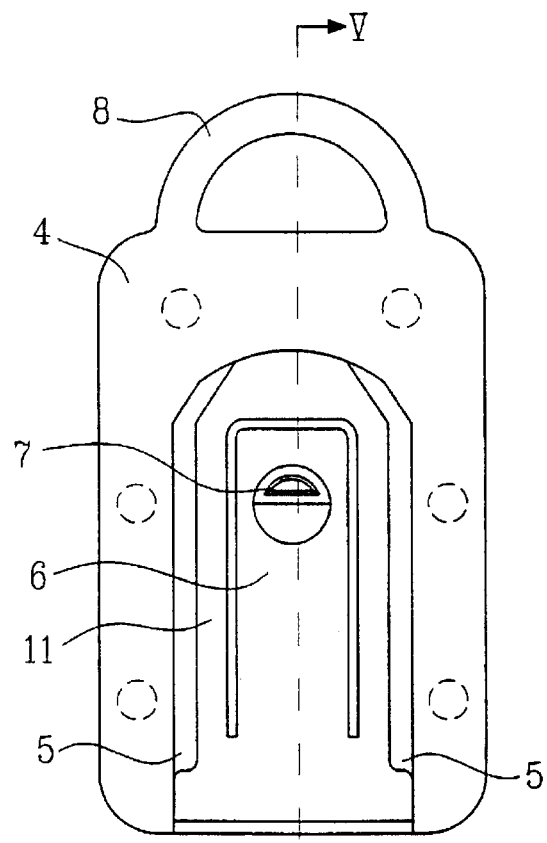
FIG. 4 shows an adapter according to the present invention in a frontal view.
Figure 5:
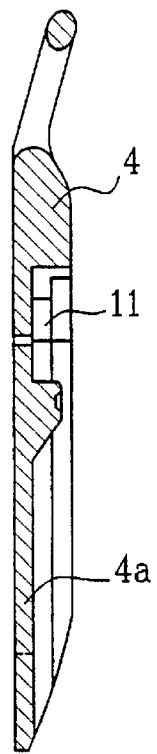
FIG. 5 shows the adapter according to FIG. 4 seen from above.
Figure 6:
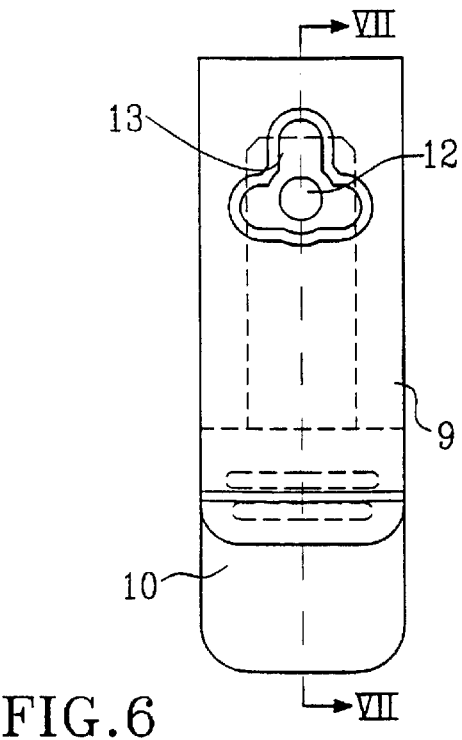
FIG. 6 shows a holder according to the invention in the form of a clip in a frontal view.
Figure 7:
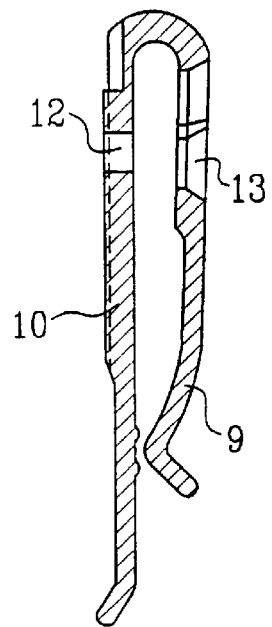
FIG. 7 shows the clip in a cross-section along the line VII—VII of FIG. 6.
Figure 8:
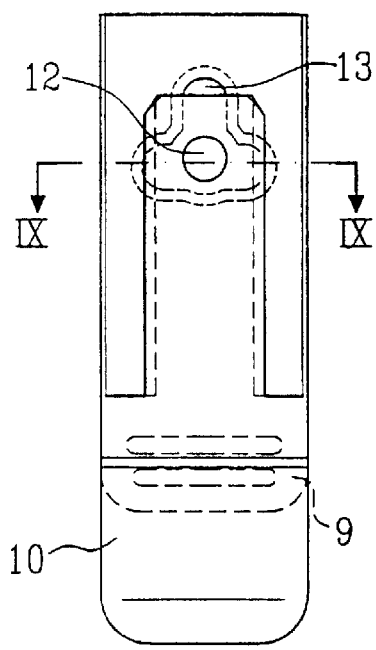
FIG. 8 shows the clip of FIG. 6 seen from behind.
Figure 9:
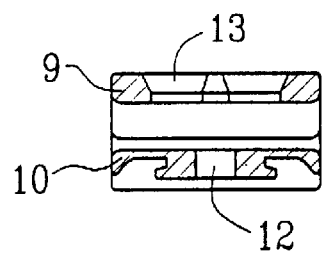
FIG. 9 shows the clip in a cross-section along the line IX—IX of FIG. 8.
Figure 10:
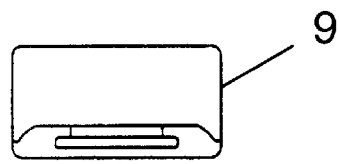
FIG. 10 shows the clip of FIG. 6 seen from above.
Figure 11:
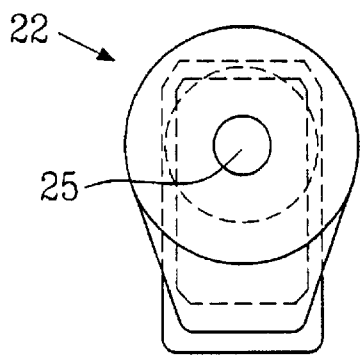
FIG. 11 shows a holder according to the invention in the form of a button in a frontal view.
Figure 12:
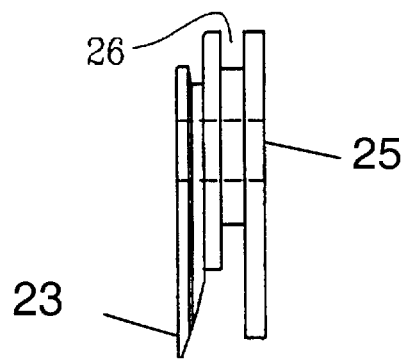
FIG. 12 shows the button of FIG. 11 seen from the side.
Figure 13:
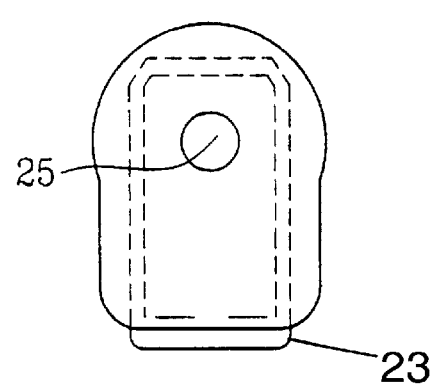
FIG. 13 shows a holder according to the invention in the form of an alternative button in a frontal view.
Figure 14:
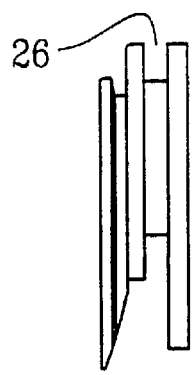
FIG. 14 shows the button according to FIG. 13 seen from the side.
Figure 21:
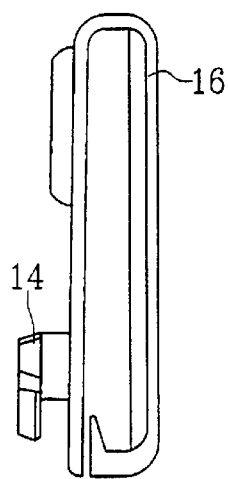
FIG. 21 shows the belt holder in a cross-section along the line XXI—XXI of FIG. 17.
Figure 22:
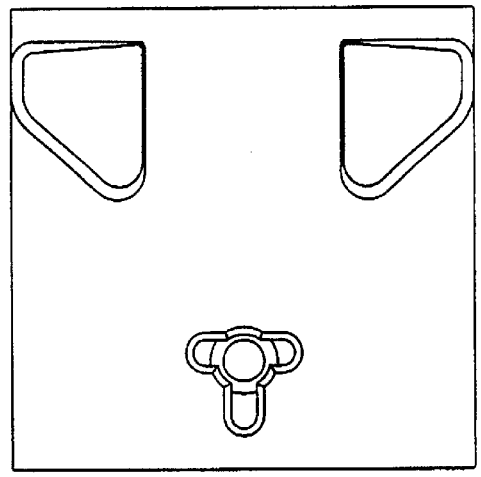
FIG. 22 shows the belt holder according to FIG. 17 seen from behind.

A case or bag (not shown) intended for a mobile phone and made of a polymer, a leather/skin material, a fabric material or a laminate of any of these materials is adapted to the intended mobile phone. On the inside of the case there is a stiffening plate 2 arranged, which plate 2 has a substantially rectangular design and is made of suitable polymeric material which provides stiffness and strength. (FIGS. 1–3). The plate 2 shows a number of pins 3 which are designed to be brought through the case material and be brought into an adapter 4 and become welded together with this such as by means of heat or ultrasound. The adapter 4 (FIGS. 4–5) which is conveniently made of the same material as the stiffening plate 2 has a substantially rectangular design and comprises a back part (first washer) 4a, and a flange 5 extending along three sides to form a U-shaped space 11. The space 11 formed by the flange can receive holders of different kinds. The rear wall of the adapter 4 comprises a locking snapping tongue made up of a resilient tongue 6 with a pin 7 intended to lock a holder to the adapter 4. The adapter 4 is further provided with a loop 8 in its upper part intended for hanging the case with its phone therein.

FIGS. 6–10 show a clip 9 which in its rear side comprises a plate (second washer) 10 intended to be brought into the space 11 of the adapter 4 formed by the flange, whereby the pin 7 tightens into a hole 12 arranged in the back part of the clip 9. The clip 9 comprises on its frontal side a key hole 13 having an irregular leaf form, which key hole 13 is intended to receive a correspondingly designed key bit on a pin 14 on a second holder, such as a vehicle holder or belt holder.

A second holder (first belt holder) 15 (FIGS. 17–22; 31–34) comprises a body 16 arranged to be slipped onto a belt or sash whereby said key bit on a pin 14 is placed on the front lower side of the body 16 and turned in such away the clip 9 has to be turned 180° to be able to fit its key hole 13 to the key bit on a pin 14 and to bring this into the key hole 13, whereupon the clip 9 is turned 180° and the key bit on a pin 14 becomes locked. Further, the first belt holder 15 comprises on its side opposite to the key bit on a pin 14 a rectangular recess 17 which on both sides thereof exhibits two vertically oriented edgings 18 provided with hooks arranged to fit into a belt lock 19 arranged in said recess 17 (FIGS. 31–34). The belt lock 19 exhibits corresponding hooks 20 arranged to fit into said hook provided edgings 18. Further, the belt lock 19 has a horizontally arranged support surface 21 running within said body 16, which surface is applied beneath a belt edge. By bringing the belt lock 19 upwardly in the recess 17, the free space 48 of the first belt holder 15 is adapted to the actual height of the belt or sash, and the belt lock 19 is fixed to the first belt holder 15 via its hook provided edgings 18. Hereby, the first belt holder 15 will sit firmly on the belt and will neither slip around nor move in a vertical direction, which may be inconvenient and wear out the belt.

In FIGS. 11–16 a holder (a button holder) 22 is shown comprising a rectangular back part (plate or second washer) 23 arranged to be received by the U-shaped space 11 formed by the flange of the adapter 4, and a circular button part 24 provided with radially and peripherally extending recess 26, which button part is provided with a through-going hole 25, adapted to receive the pin 7 belonging to the tongue 6 and thereby to lock the button holder 22 to the adapter 4. The recess 26 of the button part 24 is adapted to able to be brought into a belt holder or a vehicle holder.

Figure 23:
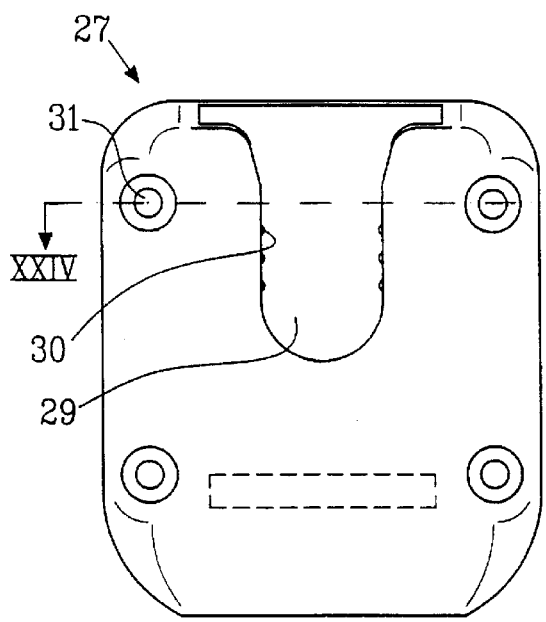
FIG. 23 shows a holder according to the invention placed in a vehicle.
Figure 24:
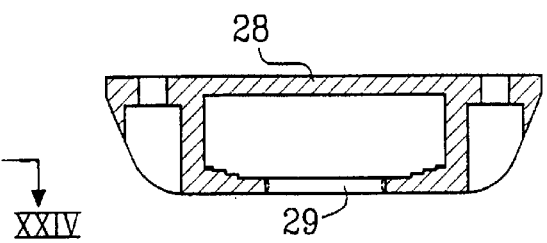
FIG. 24 shows the vehicle holder according to FIG. 23 seen from above.
Figure 25:
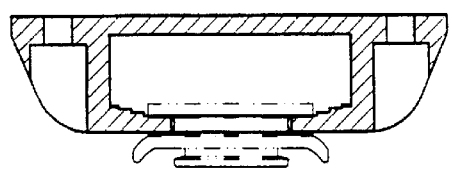
FIG. 25 shows the vehicle holder according to FIG. 24 with an inserted button according to FIG. 11.
Figure 31:
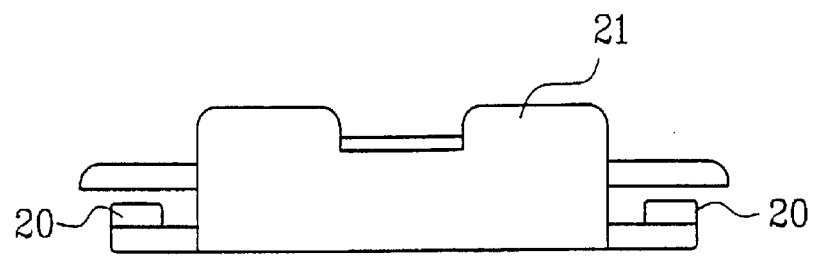
FIG. 31 shows a belt lock of the belt holder according to FIG. 17 and FIG. 26 in a frontal view.
Figures 32, 33:
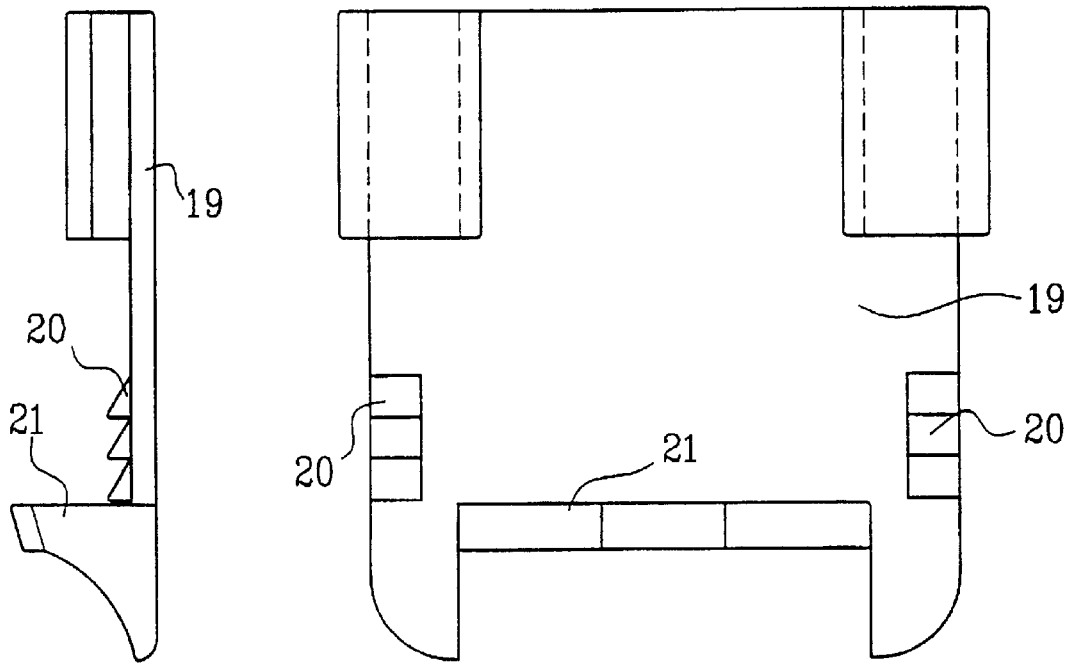
FIG. 32 shows the belt lock according to FIG. 31 seen from above.
FIG. 33 shows the belt lock according to FIG. 31 seen from underneath.
Figure 34:
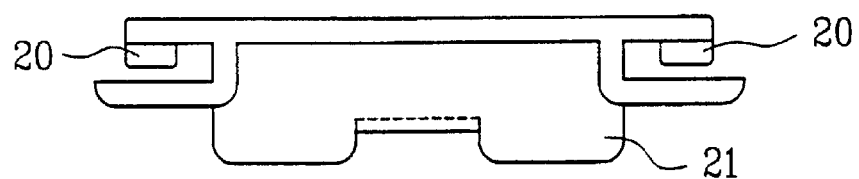
FIG. 34 shows the belt lock according to FIG. 31 seen from the side.
Figure 35:
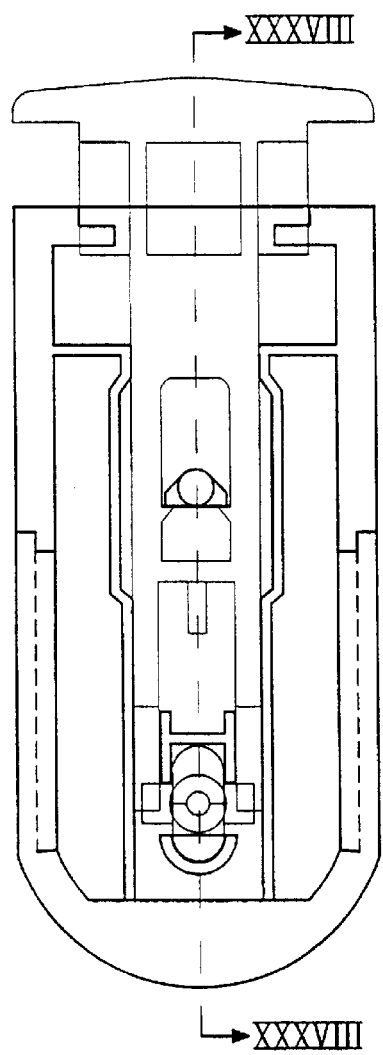
FIG. 35 shows a clip according to the invention for multi purpose use in a frontal view.
Figure 36:
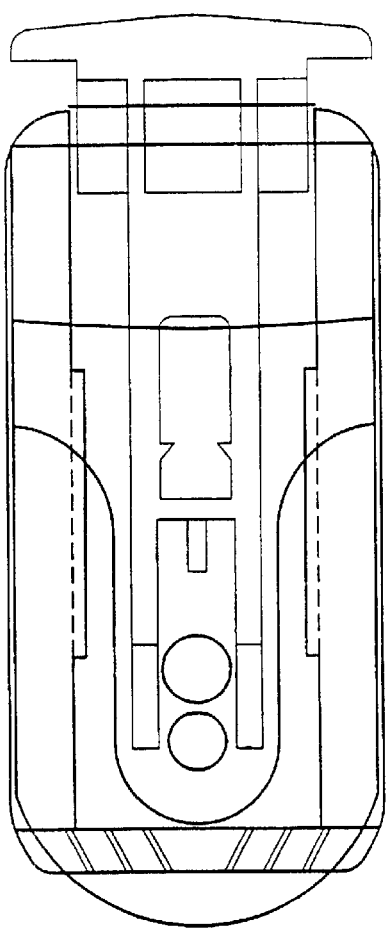
FIG. 36 shows the clip of FIG. 35 seen from behind.

A second holder (vehicle holder) 27 (FIGS. 23–25) comprises a back part 28 and a forwards facing pocket 29 provided with a U-shaped recess 30. The vehicle holder 27 is arranged to become either screwed via screw holes 31 to a panel of a vehicle or become releasably glued to such a panel. The cross depth of the pocket 29, i.e. the distance from the back part 28 to the pocket 29 is conveniently adapted to be able to receive and hold different clip models arranged onto mobile phones.

FIGS. 26–34 shows a variation of a holder (belt holder) 32 comprising a body 33 being slidable onto a belt, whereby the belt holder 32 further comprises a rectangular recess 34 on its rear side, which recess on its two sides exhibits two vertically oriented hook provided edgings 35 arranged to fit into a belt lock 19 arranged in said recess 34. The belt lock 19 hereby exhibits a horizontally arranged support surface 21 running within said body 33, which surface is applied beneath a belt edge. By bringing the belt lock 19 upwardly in the recess 34 the free space 49 of the belt holder 32 is adapted to the actual height of the belt or sash, and the belt lock 19 is fixed to the belt holder 32 via its hook provided edgings 35. On the front side of the belt holder 32 a pocket 39 is arranged to receive a button 22 which pocket 39 exhibits a U-shaped recess 40. The entrance to the pocket 40 is hereby V-shaped to facilitate introduction of the button 22 into the U-shaped recess 40 of the pocket 39. The pocket 39 exhibits two lateral openings 41 having rectangular cross-sections into which lateral openings two spring-biased release grips 42 are arranged. The release grips 42 are arranged to influence two resilient tongues 44 arranged in the back part by means of tongues 43, from which tongues 44 locking pins 45 are extending and arranged to lock the button 22. The pins 45 are hereby arranged to each tongue 44 via an oblique neck the oblique surfaces of which are a supporting plane to the tongues 43 and the oblique surfaces 47 thereof.

An alternative of the belt holder 32 is a belt clip 51 (FIGS. 35–41) which comprises a spring biased back part 52, a central body 53 and a spring(not shown) arranged between these parts 52 and 53. Further, in the central body 53, there is a pin 56 which, by means of the spring (not shown), is arranged to be introduced into and maintained in a hole 25 of a button holder 22 or a hole 12 of a clip 9. The pin 56 is arranged to be moved out of its locking position of hole 25, or 12, alternatively, by means of a release fork 57 forced by a spring 60, which fork 57 is provided with two fingers 58 with oblique surfaces 59 which act upon the pin 56.

An alternative of a holder to be arranged to the adapter 4 is a strap (not shown) to become arranged to the hook 8 shown on the adapter 4. Hereby the strap can serve as a wrist strap, neck strap or shoulder strap to the object arranged to the adapter 4.

In the embodying examples above the adapter 4 has been fixed to the case via a stiffening plate 22. It is obvious that the adapter 4 can be arranged in other ways to a case, such as by means of gluing or welding or if used on a tool be a more or less integrated part thereof.

What is claimed is:

1. Adapter system comprising:
   an adapter comprising a first washer having a substantially U-shaped space provided with a a flange, and a locking snapping tongue, and
   a holder provided with a second washer arranged to be brought into said flange provided space in said first washer,
   wherein the holder comprises a clip intended to be able to be fixed over a pocket opening, a belt, or trousers band.

2. Adapter system according to claim 1, wherein the clip on its side opposite to the second washer comprises a key hole formed to receive a key bit which in turn is attached to a second holder.

3. Adapter system comprising:
an adapter comprising a first washer having a substantially U-shaped space provided with a flange, and a locking snapping tongue,
a holder provided with a second washer arranged to be brought into said flange provided space in said first washer, and
a stiffening plate attached to the inside of a case which plate is fixed to said adapter by through-going pins.

4. Adapter system comprising:
an adapter comprising a first washer having a substantially U-shaped space provided with a flange, and a locking snapping tongue, and
a holder provided with a second washer arranged to be brought into said flange provided space in said first washer,
wherein a second holder is further attached to said holder, which second holder exhibits a back part and a front pocket provided with an U-shaped recess.

5. Adapter system comprising:
an adapter comprising a first washer having a substantially U-shaped space provided with a flange, and a locking snapping tongue, and
a holder provided with a second washer arranged to be brought into said flange provided space in said first washer,
wherein a second belt holder is further arranged to said holder, which second belt holder comprising a body being slidable onto a belt and further comprising on its rear side a rectangular recess which on its two sides thereof exhibits two vertically oriented hook provided edgings arranged to fit into a belt lock arranged in said recess which exhibits corresponding hooks adapted to fit into said hook provided edgings.

6. Adapter system according to claim 2, wherein said second holder comprises a body being slidable onto a belt, whereby the second holder further comprises on its rear side a rectangular recess which on its two sides thereof exhibits two vertically oriented hook provided edgings adapted to fit into a belt lock arranged in said recess which exhibits corresponding hooks adapted to fit into said hook provided edgings.

7. An adapter system comprising:
an adapter comprising:
a back part having a tongue, wherein the tongue is substantially planar with the back part;
a flange connected to-the back part such that the flange and the back part form a U-shaped space having an open end and an open top, wherein the tongue is located within the U-shaped space; and
a pin extending from the tongue into the U-shaped space towards the open top; and
a holder comprising a plate having a shape and dimensions such that the plate can be inserted into the U-shaped space of the adapter through the open end in a manner that engages the flange, and wherein a hole is formed in the holder through which the pin on the tongue of the adapter emerges when the plate is inserted into the U-shaped space.

8. The adapter system of claim 7, wherein the holder further comprises a clip attached to the plate in an overlapping and substantially parallel manner such that the clip forms a slot with the plate such that a belt, band, or pocket opening fits into the slot between the plate and clip.

9. The adapter system of claim 7, wherein the holder further comprises a clip attached to the plate in an overlapping and substantially parallel manner such that the clip forms a slot with the plate, and wherein a key hole is formed within the clip.

10. The adapter system of claim 9, further comprising a second holder, wherein the second holder comprises a body with a free space located within such that the body can be slid onto a belt or sash, a key bit located on one side of the body and having such size and dimensions to be able to fit inside the key hole of the holder, and wherein the second holder is attachable to the holder by inserting the key bit into the key hole and rotating the second holder until the key bit is locked into the key holder, and wherein the second holder further comprises a rectangular recess located on the opposite side of the body as the key bit, wherein the rectangular recess has two opposing sides that exhibit vertically oriented edgings provided with hooks, and wherein the edgings provided with hooks are adapted to fit into a belt lock arranged in said rectangular recess, said belt lock having corresponding hooks adapted to fit into said edgings provided with hooks.

11. The adapter system of claim 9, further comprising a second holder wherein the second holder comprises a back part attached to a forwards-facing pocket provided with an U-shaped recess, wherein the back part may be attached to a vehicle and wherein the forwards-facing pocket creates a pocket with the back part, and wherein the pocket has a depth such that the clip can be inserted therein.

12. The adapter system of claim 9, wherein the holder further comprises a circular button part attached to the plate and wherein the circular button part is provided with a radially extending peripheral recess.

13. The adapter system of claim 12, further comprising a second holder wherein the second holder comprises a body with a free space located within such that the body can be slid onto a belt or sash, a rectangular recess located on one side of the body, wherein the rectangular recess has two opposing sides that exhibit vertically oriented edgings provided with, and wherein the edgings provided with hooks are adapted to fit into a belt lock arranged in said rectangular recess, said belt lock having corresponding hooks adapted to fit into said edgings provided with hooks, and a forwards-facing pocket located on the opposite side of the body of the rectangular recess and provided with an U-shaped recess, wherein the forwards-facing pocket creates a pocket with the body into which the circular button part may be inserted to attach the second holder to the holder, and wherein the pocket exhibits two lateral openings into which two spring-biased release grips are inserted such that the release grips influence two resilient tongues to lock the circular button part into the pocket.

14. The adapter system of claim 12, further comprising a second holder wherein the second holder comprises a back part attached to a forwards-facing pocket provided with an U-shaped recess, wherein the back part may be attached to a vehicle and wherein the forwards-facing pocket creates a pocket with the back part, and wherein the pocket has a depth such that the circular button part can be inserted therein.

15. The adapter system of claim 7, further comprising a stiffening plate comprising two or more through-going pins, said stiffening plate to be placed inside a case and the through-going pins of which are attached through holes in the case to the adapter.

16. An adapter system comprising:
an adapter comprising:
a back part having a tongue, wherein the tongue is substantially planar with the back part;

a flange connected to the back part such that the flange and the back part form a U-shaped space having an open end and an open top, wherein the tongue is located within the U-shaped space; and a pin extending from the tongue into the U-shaped space towards the open top; and a holder comprising a plate having a shape and dimensions such that the plate can be inserted into the U-shaped space of the adapter through the open end in a manner that engages the flange, and wherein a hole is formed in the holder through which the pin on the tongue of the adapter emerges when the plate is inserted into the U-shaped space, and wherein a key hole is formed in the opposite side of the holder as the hole, and wherein the key hole is not a perfectly circular hole; and a second holder comprising a key bit of such size and dimensions to fit inside the key hole of the holder, said second holder attachable to the holder by inserting the key bit into the key hole and rotating the second holder until the key bit is locked into the key holder.

17. The adapter system of claim 16, further comprising a stiffening plate comprising two or more through-going pins, said stiffening plate to be placed inside a case and the through-going pins of which are attached through holes in the case to the adapter.

\* \* \* \* \*